May 17, 1927.
W. W. VOSPER
1,628,757
RATCHET THREADING TOOL
Filed Sept. 28, 1925
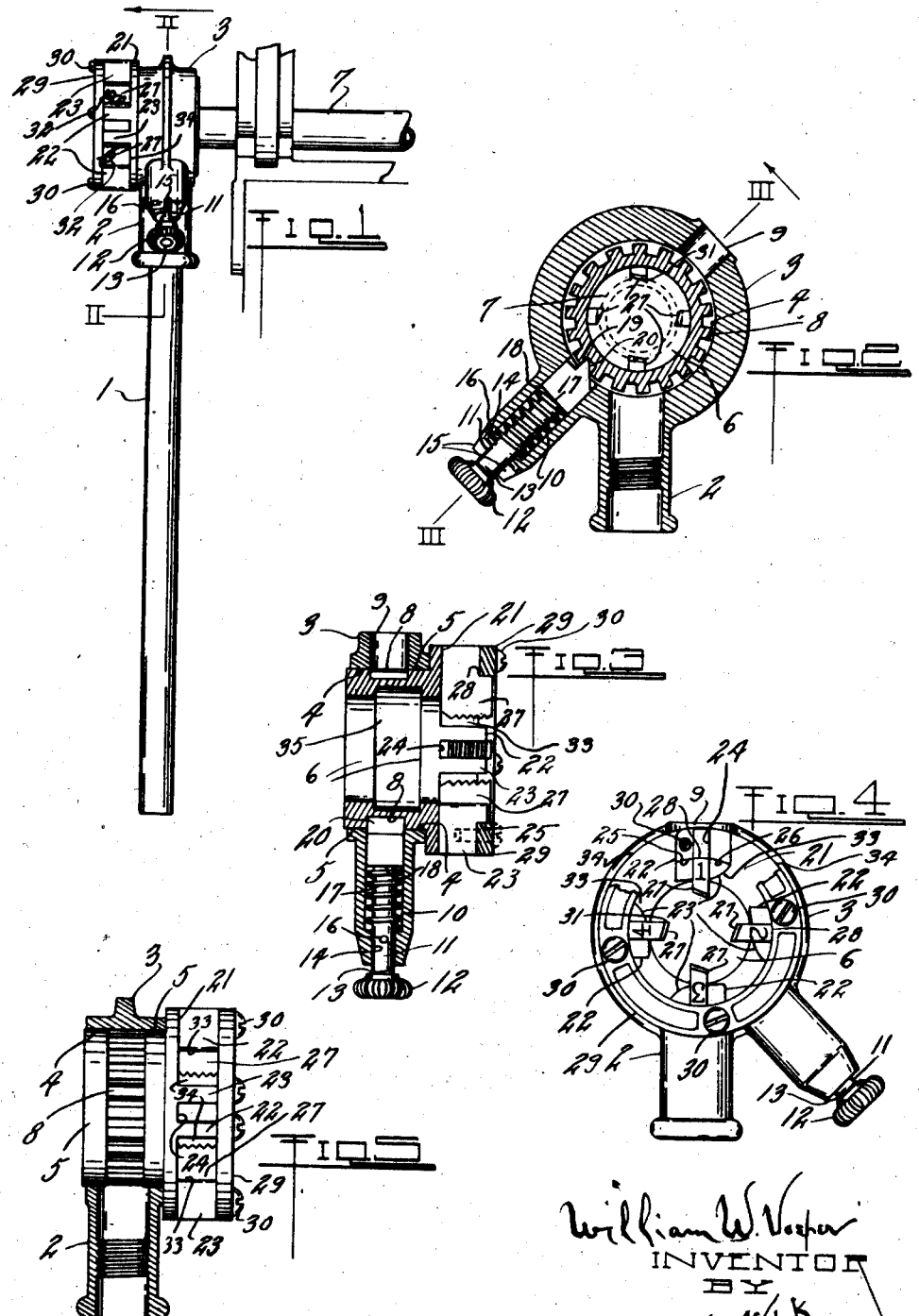
William W. Vosper
INVENTOR
BY
Geo. Kirk
ATTORNEY Patented May 17, 1927.

1,628,757

UNITED STATES PATENT OFFICE.

WILLIAM W. VOSPER, OF TOLEDO, OHIO, ASSIGNOR TO THE TOLEDO PIPE THREADING MACHINE COMPANY, OF TOLEDO, OHIO, A CORPORATION OF OHIO.

RATCHET THREADING TOOL.

Application filed September 28, 1925. Serial No. 59,056.

This invention relates to threading tools, especially for pipe.

This invention has utility when incorporated in die or chaser tool mountings.

Referring to the drawings:

Fig. 1 is a side elevation of an embodiment of the invention as in use;

Fig. 2 is section on an enlarged scale on the line II—II, Fig. 1;

Fig. 3 is a section on the line III—III, Fig. 2;

Fig. 4 is an end elevation, with parts broken away, of the device of Fig. 1; and Fig. 5 is a fragmentary side elevation of the device of Fig. 1.

Bar 1, as a lever, is inserted in socket 2 of ring 3. This ring 3 has internal bearing 4 coacting with external bearings 5. The bearings 5 have internal bore 6 as a guide sleeve in supporting this tool upon the article of work as pipe 7. Between the bearings 5, this sleeve has an endless annular series of teeth 8 abrupt in each direction to serve as a ratchet. The ring 3 has radial way 9 diametrically disposed as to seat 10 in which is mounted stem 11 having external button 12 having wedged thread connection 13 with the plunger 11. This seat 10 has guide opening 14 for the stem or plunger 11 with pair of diametrically disposed notches 15 to be engaged by pin 16. Helical spring 17, about this stem 11, normally draws this pin 16 against the outer end of this seat 10, or if in registry, holds such in the seats 15 for the one portion of this helical spring 17 abuts enlargement 18 terminating in pawl face 19 on one side with bevel face 20 on the other. This pawl, accordingly, may be held away from the ratchet 8 when the pin 16 is out of the slots or notches 15 while with this pin 16 in the notches 15, the handle 1 may be operated for pawl actuating connection with the ratchet in one direction. By withdrawing the pawl and rotating 180° to again allow the pin 16 to enter the seats or notches 15, the pawl 19 may be effective for the opposite direction of rotation of the ratchet 8.

From this ratchet 8 there radially extends annular series of columns herein shown as mounted on flange 21 from the ratchet. These columns are shown as comprising major column portion 22 and minor column portion 23. These divided columns 22, 23, have therebetween seat 24. The column portion 22 has outwardly facing shoulder 25. The column portion 23 has outwardly facing shoulder 26. These shoulders 25, 26, are in an annular series. There is disposed in the seat 24 between the column portion pairs, chasers 27 having outwardly facing shoulders 28 between the adjacent shoulders 25, 26, so that ring 29 as anchored by screws 30, may positively hold the annular series of chasers 27 against any radial shifting as well as snugly position such dies longitudinally, for this ring 29 closes the axially open seats 24. These chasers 27, in practice, as in pipe threading operations, co-operate progressively in the depth of thread cutting upon the pipe 7. The bore portions 6 provide a guide along which the tool may progress as the thread is developed. In this cutting operation, the forward or advance die edge portions 31 as entering the work 7 sluff off turnings 32 which are free to pass by clearance portion 33 on the column portion 23, and thence freely pass outward through opening 34 between the columns. There is thus provided a ready spill region, in this multiple die or chaser tool, with such clearance way 34 one accessible for the introduction of lubricant to the work.

This die as herein disclosed is one simply produced, as a unit, from cast stock as to the ratchet and column structure. The bore or guide portions 6 may have clearance 35 therebetween for giving lightness to the structure, as well as reducing the bearing regions upon the pipe or cylindrical stock. The extent of the shoulder or flange 21 relatively to the ratchet may vary according to the diameter of stock for which the tool is designed. In the operation of the ratchet lever arm, the tool may be operated for either direction of rotation as desired whether the cutting work be either right hand or left hand. The tool may be backed off by merely reversing the tool. Furthermore, the withdrawal of the tool allows the ring to be slipped on and off the ratchet for substitution of ratchets or for reverse placement of the ring on the same ratchet. There is, accordingly, provided herein a simple tool structure of light weight open for ready clearance in the handling of stock cuttings or turnings which may be efficiently operated.

What is claimed and it is desired to secure by United States Letters Patent is:—

1. A threading tool embodying a ratchet, a first ring, a pawl mounted by said first ring and positioned for actuating the ratchet, said ratchet providing a bearing sleeve for the first ring, said sleeve internally serving as a guide, an annular series of divided columns rising axially from the ratchet sleeve, dies in the divisions of said columns as seats, a second ring spaced from the sleeve of the columns, and means anchoring the second ring with the column in die anchoring position, said columns in the direction of the die entering travel into the material to be threaded having greater radial clearance than on the after side of said dies, for ready spill of turnings from the material outward between said columns.

2. A threading tool embodying a ratchet, a series of chasers, an annular series of spaced chaser carrying columns, one for each chaser rising laterally from said ratchet, and laterally of and concentric with said ratchet an independent holding ring for said chasers mounted on said columns leaving toward said ratchet from the ring clearance between the columns for ready spill of turnings from the material outward between the columns.

3. A threading tool embodying a ratchet, an annular series of spaced columns rising axially from said ratchet and axially terminating in an annular series of shoulders, said columns having radially extending seats open away from the ratchet, dies in said seats having shoulders approximating the radial position of the column shoulders, and a ring centered by said column shoulders to be abutted by said die shoulders for maintaining the dies against radial shifting, said ring leaving clearance between the columns for ready spill of turnings from the material outward toward said columns.

In witness whereof I affix my signature.

WILLIAM W. VOSPER.